United States Patent
Suwabe et al.

(10) Patent No.: US 10,228,055 B2
(45) Date of Patent: Mar. 12, 2019

(54) CONTINUOUSLY VARIABLE TRANSMISSION AND METHOD FOR CONTROLLING THE SAME

(71) Applicant: JATCO Ltd, Fuji-shi, Shizuoka (JP)

(72) Inventors: Masashi Suwabe, Kawasaki (JP); Tetsuya Izumi, Ayase (JP); Masayuki Miyazono, Isehara (JP); Takuichiro Inoue, Yamato (JP); Kunihiro Takahashi, Atsugi (JP); Makoto Komatsu, Atsugi (JP); Yuji Okamoto, Atsugi (JP)

(73) Assignee: JATCO LTD, Fuji-Shi (JP)

( * ) Notice: Subject to any disclaimer, the term of this patent is extended or adjusted under 35 U.S.C. 154(b) by 53 days.

(21) Appl. No.: 15/329,718

(22) PCT Filed: Jun. 3, 2015

(86) PCT No.: PCT/JP2015/066035
§ 371 (c)(1),
(2) Date: Jan. 27, 2017

(87) PCT Pub. No.: WO2016/017271
PCT Pub. Date: Feb. 4, 2016

(65) Prior Publication Data
US 2017/0211697 A1 Jul. 27, 2017

(30) Foreign Application Priority Data
Jul. 29, 2014 (JP) ................. 2014-154079

(51) Int. Cl.
*F16H 61/662* (2006.01)
*F16H 61/12* (2010.01)
(Continued)

(52) U.S. Cl.
CPC .......... *F16H 61/662* (2013.01); *F16H 61/02* (2013.01); *F16H 61/12* (2013.01); *F16H 61/702* (2013.01); *F16H 61/00* (2013.01); *F16H 61/66* (2013.01); *F16H 61/66259* (2013.01); *F16H 2037/023* (2013.01)

(58) Field of Classification Search
None
See application file for complete search history.

(56) References Cited

U.S. PATENT DOCUMENTS 5,050,457 A * 9/1991 Takayama ............. F16H 37/021
192/44
9,964,207 B2 * 5/2018 Takahashi ............... F16H 61/12
(Continued)

FOREIGN PATENT DOCUMENTS

JP 2005-121127 A 5/2005

*Primary Examiner* — Justin Holmes
(74) *Attorney, Agent, or Firm* — Foley & Lardner LLP (57) ABSTRACT

A transmission controller increases hydraulic pressure supplied to a secondary pulley and decreases hydraulic pressure supplied to a primary pulley to shift a variator to a mechanical Low speed ratio when the hydraulic pressure supplied to the primary pulley and the secondary pulley vibrates. The transmission controller shifts the variator from the mechanical Low speed ratio to a High side when a sub-transmission mechanism is downshifted during controlling a speed ratio of the variator at the mechanical Low speed ratio.

8 Claims, 6 Drawing Sheets

(51) Int. Cl.
  *F16H 61/02*  (2006.01)
  *F16H 61/70*  (2006.01)
  *F16H 61/00*  (2006.01)
  *F16H 61/66*  (2006.01)
  *F16H 37/02*  (2006.01)

(56) References Cited

U.S. PATENT DOCUMENTS

| | | | | |
|---|---|---|---|---|
| 2012/0021870 | A1* | 1/2012 | Tasaka | B60W 10/06 |
| | | | | 477/44 |
| 2012/0135829 | A1* | 5/2012 | Doihara | F16H 61/66272 |
| | | | | 474/28 |
| 2012/0142494 | A1* | 6/2012 | Yamada | B60W 10/026 |
| | | | | 477/175 |
| 2012/0322613 | A1* | 12/2012 | Suzuki | F16H 61/16 |
| | | | | 477/41 |
| 2013/0150208 | A1* | 6/2013 | Wakayama | B60W 10/06 |
| | | | | 477/68 |
| 2013/0151109 | A1* | 6/2013 | Waku | G06F 17/00 |
| | | | | 701/99 |
| 2013/0151129 | A1* | 6/2013 | Tatewaki | F02D 45/00 |
| | | | | 701/112 |

* cited by examiner

FIG. 6

CONTINUOUSLY VARIABLE TRANSMISSION AND METHOD FOR CONTROLLING THE SAME

TECHNICAL FIELD

The present invention relates to a belt continuously variable transmission, especially relates to a technique that damps vehicle body vibration when hydraulic pressure vibration occurs.

BACKGROUND ART

A belt continuously variable transmission changes groove widths of pulleys by hydraulic pressure to steplessly change a speed ratio. For such configuration, if the hydraulic pressure supplied to pulley vibrates for any cause, the speed ratio changes to cause driving force change, thus a vehicle body vibrates. The vibration of the hydraulic pressure often occurs caused by, for example, an oil pump structure, an oil passage structure, and valve characteristics.

In this respect, JP2005-121127A discloses a technique that an accumulator is coupled to an oil passage from an oil pump up to pulleys to absorb hydraulic pressure by the accumulator.

SUMMARY OF INVENTION

However, when employing the configuration that couples the accumulator to the middle of the oil passage, increase in cost and weight by increase of the number of components is a problem.

The present invention has been made in view of such technical problem, and it is an object of the present invention to damp vehicle body vibration that occurs caused by hydraulic vibration.

According to an aspect of the present invention, a continuously variable transmission includes a primary pulley and a secondary pulley each configured to change a groove width corresponding to supplied hydraulic pressure; a variator including a belt wrapped around the primary pulley and the secondary pulley; a stepped sub-transmission mechanism disposed at an input side or an output side of the variator; and a control unit. The control unit is configured to increase the hydraulic pressure supplied to the secondary pulley and decrease the hydraulic pressure supplied to the primary pulley to shift the variator to a mechanical Low speed ratio (a first speed ratio) when the hydraulic pressure supplied to the primary pulley and the secondary pulley vibrates, the mechanical Low speed ratio being a speed ratio where the groove width of the primary pulley has a maximum value possible to be employed in structure of the primary pulley; and shift the variator from the mechanical Low speed ratio to a High side (a second side) when the sub-transmission mechanism is downshifted during controlling a speed ratio of the variator at the mechanical Low speed ratio.

Another aspect of the present invention provides a method for controlling corresponding to this.

According to the above-described aspects, while the hydraulic pressure vibrates, the variator is shifted to the mechanical Low speed ratio, thus the groove width of the primary pulley does not expand even if a primary pressure vibrates. That is, change to a Low side (a first side) of the speed ratio of the variator is restricted. This decreases a speed ratio change of the variator to damp the vehicle body vibration.

When the sub-transmission mechanism is downshifted during controlling the speed ratio of the variator at the mechanical Low speed ratio, if only the sub-transmission mechanism is downshifted while holding the speed ratio of the variator at the mechanical Low speed ratio, shift shock occurs. Furthermore, afterwards, when separating the variator from the mechanical Low speed ratio, driving force change occurs and a driver feels uncomfortable feeling.

However, the above-described aspect shifts the variator from the mechanical Low speed ratio to the High side when the sub-transmission mechanism is downshifted. This ensures suppression of the speed ratio change compared with a case where the sub-transmission mechanism and the variator are separately shifted to prevent such uncomfortable feeling.

DESCRIPTION OF EMBODIMENTS

The following describes an embodiment of the present invention with reference to the accompanying drawings. It should be noted that, in the following description, a "speed ratio" of a certain transmission mechanism indicates a value obtained by dividing an input rotation speed of this transmission mechanism by an output rotation speed of this transmission mechanism.

Figure 1:
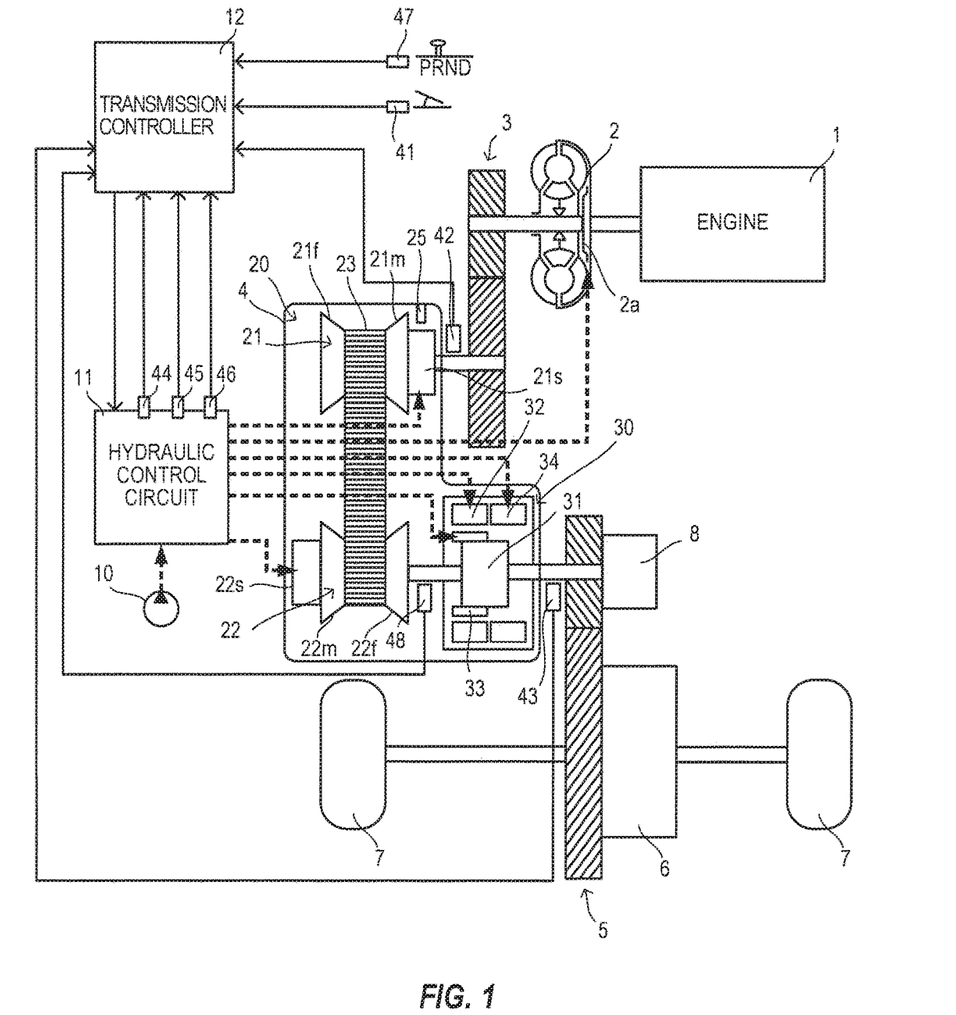
FIG. 1 is a schematic configuration diagram of a vehicle on which a continuously variable transmission according to an embodiment of the present invention is mounted.

FIG. 1 is a schematic configuration diagram of a vehicle on which a continuously variable transmission according to the embodiment of the present invention is mounted. This vehicle includes an engine 1 as a power source. Output rotation of the engine 1 is transmitted to driving wheels 7 via a torque converter 2, a first gear train 3, a transmission 4, a second gear train 5, and a differential gear 6. A parking mechanism 8 that mechanically unrotatably locks an output shaft of the transmission 4 in parking is disposed on the second gear train 5.

The engine 1 is an internal combustion engine such as a gasoline engine and a diesel engine.

The torque converter 2 includes a lock-up clutch 2a. If the lock-up clutch 2a is engaged, slip at the torque converter 2 disappears to ensure improving transmission efficiency of the torque converter 2.

The vehicle includes an oil pump 10 that is driven by using a part of power of the engine 1, a hydraulic control circuit 11 that regulates hydraulic pressure from the oil pump 10 to supply it to each part of the transmission 4, and a transmission controller 12 that controls the hydraulic control circuit 11.

The transmission 4 is a continuously variable transmission including a variator 20 and a sub-transmission mechanism 30 disposed in series with respect to the variator 20. "Disposed in series" means that the variator 20 and the sub-transmission mechanism 30 are disposed in series in a power transmission path from the engine 1 up to the driving wheels 7. In this embodiment, the sub-transmission mechanism 30 is disposed at an output side of the variator 20. However, the sub-transmission mechanism 30 may be disposed at an input side of the variator 20.

The variator 20 is a continuously variable transmission mechanism including a primary pulley 21, a secondary pulley 22, and a belt 23 wrapped around the pulleys 21 and 22. The pulleys 21 and 22 include fixed conical plates 21f and 22f, movable conical plates 21m and 22m disposed in a state where sheave surfaces are opposed to the fixed conical plates 21f and 22f to form grooves with the fixed conical plates 21f and 22f, and hydraulic cylinders 21s and 22s disposed at back surfaces of the movable conical plates 21m and 22m to axially displace the movable conical plates 21m and 22m respectively. A stopper 25 that regulates the displacement of the movable conical plate 21m is disposed lateral to the movable conical plate 21m of the primary pulley 21.

Adjusting hydraulic pressure (a primary pressure Ppri and a secondary pressure Psec) supplied to the pulleys 21 and 22 changes force that the pulleys 21 and 22 sandwich the belt 23 to change a torque capacity (a transmissive maximum torque) of the variator 20, and changes groove widths to change contact radiuses of the belt 23 and the respective pulleys 21 and 22, thus a speed ratio of the variator 20 steplessly changes.

The sub-transmission mechanism 30 is a transmission mechanism having two stages for forward and one stage for backward. The sub-transmission mechanism 30 includes a Ravigneaux planetary gear mechanism 31 where carriers of two planetary gears are coupled, and a plurality of friction elements (a Low brake 32, a High clutch 33, and a Rev brake 34). Adjusting hydraulic pressure supplied to the friction elements 32 to 34 to change engagement states of the friction elements 32 to 34 changes a gear position of the sub-transmission mechanism 30. In the following description, a state that the gear position of the sub-transmission mechanism 30 is at first-speed is expressed in that "the transmission 4 is in a low-speed mode," and a state that the gear position of the sub-transmission mechanism 30 is at second-speed is expressed in that "the transmission 4 is in a high-speed mode."

The transmission controller 12 includes a CPU, a storage device including a RAM and a ROM, input/output interfaces, and a bus that mutually couples them.

Signals from the following sensors are input to the transmission controller 12 via the input/output interfaces. The sensors include an accelerator position sensor 41 that detects an accelerator position APO representing a manipulated variable of an accelerator pedal, a rotational speed sensor 42 that detects a primary rotation speed Npri, which is a rotation speed of the primary pulley 21, a vehicle speed sensor 43 that detects a vehicle speed VSP, a hydraulic pressure sensor 44 that detects a line pressure PL, a hydraulic pressure sensor 45 that detects a primary pressure Ppri, a hydraulic pressure sensor 46 that detects a secondary pressure Psec, an inhibitor switch 47 that detects a position of a select lever, and a rotational speed sensor 48 that detects a secondary rotation speed Nsec, which is a rotation speed of the secondary pulley 22.

The storage device of the transmission controller 12 stores a shift control program of the transmission 4, and a shift map (FIG. 3) used in this shift control program. The transmission controller 12 reads the shift control program stored in the storage device to cause the CPU to execute this program, thus performing predetermined arithmetic processing to signals input via the input interface to set instruction values of the hydraulic pressures supplied to each part of the transmission 4. Then, the transmission controller 12 outputs the set instruction values to the hydraulic control circuit 11 via the input/output interfaces.

The hydraulic control circuit 11 includes a plurality of flow paths and a plurality of hydraulic control valves. The hydraulic control circuit 11 controls the plurality of hydraulic control valves based on the instruction values from the transmission controller 12 to switch a supply passage of the hydraulic pressure and generates the hydraulic pressure corresponding to the instruction values to supply it to each part of the transmission 4. This performs a shift of the variator 20, the change of the gear position of the sub-transmission mechanism 30, capacity control of the respective friction elements 32 to 34, and an engagement or a disengagement of the lock-up clutch 2a.

Figure 2:
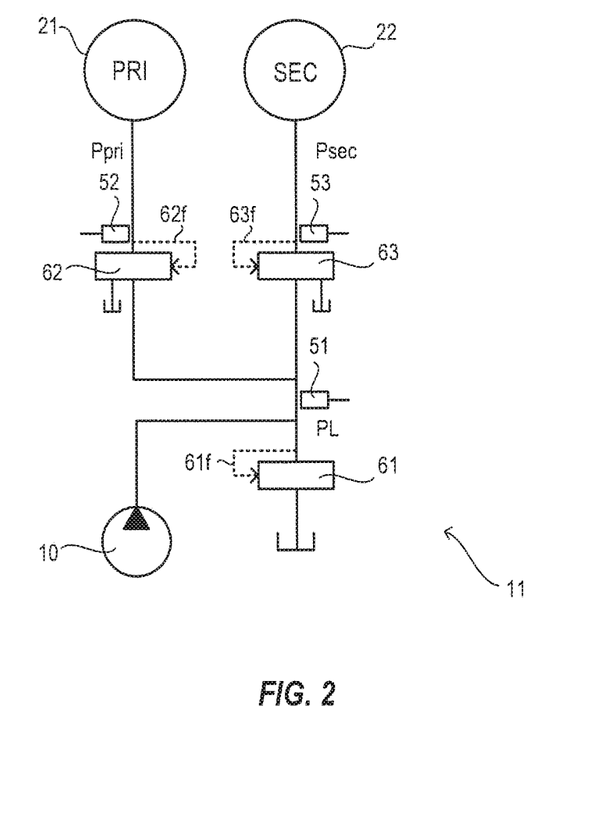
FIG. 2 is a part of a schematic configuration diagram of a hydraulic control circuit.

FIG. 2 illustrates a part relates to the shift of the variator 20 among the hydraulic control circuit 11.

A line pressure regulating valve 61 is a drain-regulate-pressure-type pressure regulating valve that drains to reduce a part of a discharge pressure of the oil pump 10 to regulate a line pressure PL to a target line pressure tPL.

A primary pressure regulating valve 62 and a secondary pressure regulating valve 63 are drain-regulate-pressure-type pressure regulating valves that drain to reduce a part of the line pressure PL, using the line pressure PL as source pressure, to regulate the primary pressure Ppri and the secondary pressure Psec to a target primary pressure tPpri and a target secondary pressure tPsec respectively.

The line pressure regulating valve 61, the primary pressure regulating valve 62, and the secondary pressure regulating valve 63 include feedback circuits 61f, 62f, and 63f that return the regulated hydraulic pressure to the pressure regulating valve to perform feedback control of the regulated hydraulic pressure to a target hydraulic pressure respectively.

With such configuration, the hydraulic control circuit 11 can independently regulate the primary pressure Ppri and the secondary pressure Psec using the line pressure PL as the source pressure.

Figure 3:
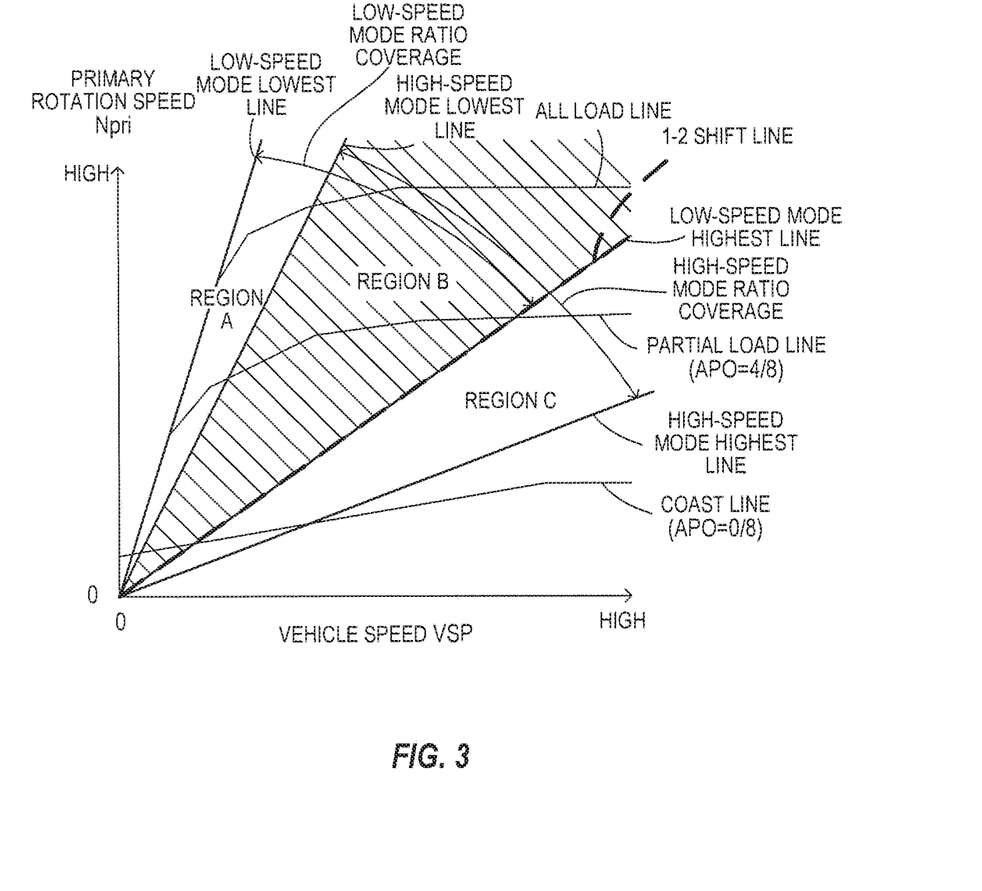
FIG. 3 is an exemplary shift map.

FIG. 3 illustrates an exemplary shift map. The transmission controller 12 controls the variator 20 and the sub-transmission mechanism 30 by referring to this shift map, corresponding to a vehicle operating state (in the embodiment, the vehicle speed VSP, the primary rotation speed Npri, and the accelerator position APO).

In this shift map, an operating point of the transmission 4 is defined by the vehicle speed VSP and the primary rotation speed Npri. A slop of a line coupling the operating point of the transmission 4 to a zero point at a lower-left corner of the shift map is corresponding to a speed ratio (an overall speed ratio obtained by multiplying the speed ratio of the variator 20 by the speed ratio of the sub-transmission mechanism 30, hereinafter referred to as a "through speed ratio") of the transmission 4. In the shift map, similar to a shift map of a conventional belt continuously variable transmission, shift lines are set by the accelerator positions APO. The shift of the transmission 4 is performed in accordance with the shift line selected corresponding to the accelerator position APO.

When the transmission 4 is in the low-speed mode, the transmission 4 can be shifted between a low-speed mode Lowest line obtained such that the speed ratio of the variator 20 is changed to the Lowest speed ratio, and a low-speed mode Highest line obtained such that the speed ratio of the variator 20 is changed to the Highest speed ratio (Regions A and B in the drawing). On the other hand, when the transmission 4 is in the high-speed mode, the transmission 4 can be shifted between a high-speed mode Lowest line obtained such that the speed ratio of the variator 20 is changed to the Lowest speed ratio, and a high-speed mode Highest line obtained such that the speed ratio of the variator 20 is changed to the Highest speed ratio (Regions B and C in the drawing).

It should be noted that the Lowest speed ratio referred here is the maximum value in a speed ratio coverage of the variator 20 used when performing the shift control in accordance with the shift map. The variator 20, as described later, can structurally employ a speed ratio at a Low side of the Lowest speed ratio.

A mode switch that upshifts the sub-transmission mechanism 30 from first-speed to second-speed is performed when the targeted operating point of the transmission 4 crosses a 1-2 shift line from Region B to Region C. The 1-2 shift line is set so as to approximately overlap with the low-speed mode Highest line.

Figure 4:
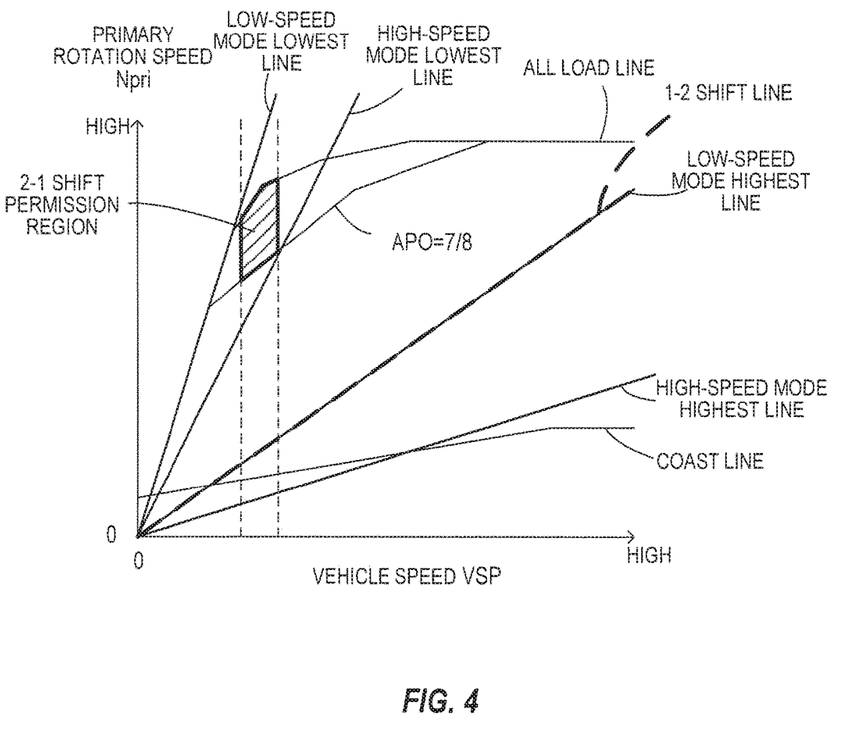
FIG. 4 is a diagram illustrating an exemplary 2-1 shift permission region.

In contrast, a mode switch that downshifts the sub-transmission mechanism 30 from second-speed to first-speed is performed when the accelerator pedal is significantly pressed in a state where the gear position of the sub-transmission mechanism 30 is at second-speed, thus the targeted operating point of the transmission 4 enters a 2-1 shift permission region illustrated in FIG. 4.

Furthermore, the transmission controller 12 performs a cooperative shift that changes the speed ratio of the variator 20 in a direction the reverse of a direction that the speed ratio of the sub-transmission mechanism 30 changes when shifting the sub-transmission mechanism 30. Specifically, the transmission controller 12 shifts the variator 20 in accordance with an inertia phase of the sub-transmission mechanism 30, and during the inertia phase, controls a capacity of an engagement side friction element or a disengagement side friction element (the Low brake 32 or the High clutch 33) of the sub-transmission mechanism 30 to continuously change an input rotation speed (corresponding to an actual speed ratio of the sub-transmission mechanism 30) of the sub-transmission mechanism 30 in accordance with the change of the speed ratio of the variator 20. This suppresses generation of a level difference at the through speed ratio during the cooperative shift to suppress shift shock when shifting the sub-transmission mechanism 30.

Now, the primary pressure Ppri and the secondary pressure Psec generate vibration by various causes. Vibration of these hydraulic pressures causes the speed ratio change of the variator 20, and eventually a driving force change to be a cause that a vehicle body vibrates.

The vibration of the hydraulic pressure occurs caused by, for example, a structure of the oil pump 10, a structure of an oil passage of the hydraulic control circuit 11, and properties of the pressure regulating valves 61 to 63. It is not easy to precisely find its cause. However, even if such vibration of the hydraulic pressure occurs, it is possible to damp such vehicle body vibration if a countermeasure is performed so as to reduce the speed ratio of the variator 20.

Therefore, the transmission controller 12 performs a vehicle-body-vibration damping process, which is described later. When the hydraulic pressure vibrates, the transmission controller 12 increases the secondary pressure Psec and decreases the primary pressure Ppri to shift to a speed ratio that the groove width of the primary pulley 21 has the maximum value possible to be employed in structure of the primary pulley 21, in the embodiment, a speed ratio when the movable conical plate 21m of the primary pulley 21 abuts on the stopper 25 (hereinafter referred to as a "mechanical Low speed ratio"). When the speed ratio of the variator 20 reaches the mechanical Low speed ratio, the movable conical plate 21m becomes not to be able to be displaced in a direction separating from the fixed conical plate 21f, thus ensuring suppression of the change to the Low side of the speed ratio of the variator 20.

Furthermore, the transmission controller 12 further decreases the primary pressure Ppri from this state to press the movable conical plate 21m to the stopper 25 by tensile force of the belt 23, thus also suppressing the displacement of the movable conical plate 21m in a direction approaching to the fixed conical plate 21f and also suppressing the change to a High side of the speed ratio of the variator 20.

Figure 5:
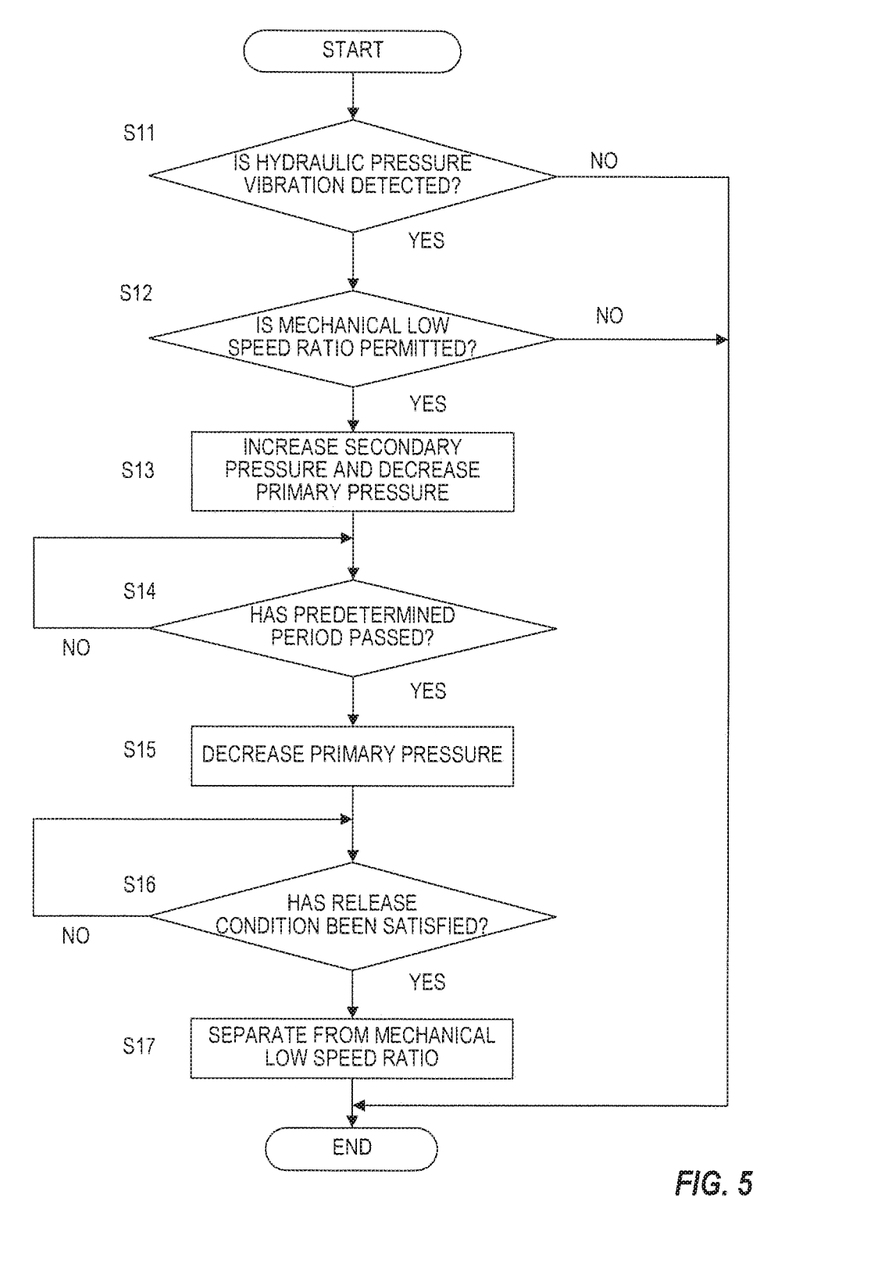
FIG. 5 is a flowchart illustrating a content of a vehicle body vibration damping control.

FIG. 5 is a flowchart illustrating a content of the vehicle-body-vibration damping process that the transmission controller 12 performs.

According to this, the transmission controller 12 determines whether the hydraulic pressure vibration is detected at Step S11. The transmission controller 12 determines that the hydraulic pressure vibration is detected, for example, when a state where an amplitude of the line pressure PL exceeds a predetermined value continues for a predetermined period. In the embodiment, the hydraulic pressure vibration is detected based on the line pressure PL; however, the hydraulic pressure vibration may be detected based on the primary pressure Ppri and the secondary pressure Psec. The transmission controller 12 advances the process to Step S12 when detecting the hydraulic pressure vibration, and terminates the process when not detecting the hydraulic pressure vibration.

At Step S12, the transmission controller 12 determines whether the speed ratio of the variator 20 is permitted to be shifted to the mechanical Low speed ratio. The shift to the mechanical Low speed ratio is permitted, for example, when the speed ratio of the variator 20 is the Lowest speed ratio. Whether the speed ratio of the variator 20 is the Lowest speed ratio may be determined based on a ratio between the primary rotation speed Npri and the secondary rotation speed Nsec, or may be determined based on the vehicle speed VSP and the gear position of the sub-transmission mechanism 30 on the premise that the shift control is performed on the shift map illustrated in FIG. 3.

A permission condition that the speed ratio of the variator 20 is the Lowest speed ratio is in order to suppress an amount of the change of the speed ratio when the speed ratio of the variator 20 is changed to the mechanical Low speed ratio to suppress uncomfortable feeling that driving force change provides to a driver.

At Step S13, the transmission controller 12 increases the target secondary pressure tPsec more than hydraulic pressure required to maintain the current speed ratio (the Lowest speed ratio) and the torque capacity (the transmissive torque) of the variator 20 to increase the secondary pressure Psec, thus changing the speed ratio of the variator 20 from the Lowest speed ratio to the mechanical Low speed ratio. At this time, the transmission controller 12 decreases the target primary pressure tPpri in accordance with the increase of the target secondary pressure tPsec to decrease the primary pressure Ppri to a pressure (a slip limit pressure PPmin) immediately before the belt 23 starts slipping.

At Step S14, the transmission controller 12 determines whether the predetermined period has passed from increasing the target secondary pressure tPsec at Step S13. The predetermined period is set to a period while the target secondary pressure tPsec is increased, the secondary pressure Psec actually increases, and then the speed ratio of the variator 20 reaches the mechanical Low speed ratio. The transmission controller 12 repeats the determination at Step S14 until determining that the predetermined time has passed, and advances the process to Step S15 when determining that the predetermined time has passed.

At Step S15, the transmission controller 12 further decreases the target primary pressure tPpri from the slip limit pressure PPmin, in this embodiment, decreases to zero. This decreases the primary pressure Ppri less than the slip limit pressure PPmin. However, the movable conical plate 21m of the primary pulley 21 is pressed to the stopper 25 by the tensile force of the belt 23, and then the belt 23 is sandwiched by the primary pulley 21 with its reactive force, thus the belt 23 does not slip.

Afterwards, the transmission controller 12 holds the speed ratio of the variator 20 at the mechanical Low speed ratio until determining that a mechanical-Low-speed-ratio release condition has been satisfied at Step S16. The transmission controller 12 determines that the mechanical-Low-speed-ratio release condition has been satisfied when any one of the following cases is satisfied:

The speed ratio of the variator 20 corresponding to the targeted operating point of the transmission 4<The Lowest speed ratio
(The vehicle speed VSP is equal to or more than a predetermined vehicle speed)
The vehicle speed VSP=0
A select lever position is at a non-running position (P position and N position)
A targeted driving point of the transmission 4 has moved to the 2-1 shift permission region.

When the mechanical-Low-speed-ratio release condition is satisfied, the transmission controller 12 advances the process to Step S17. The transmission controller 12 increases the target primary pressure tPpri and decreases the target secondary pressure tPsec to shift the variator 20 to a speed ratio corresponding to the targeted driving point of the transmission 4. When the mechanical-Low-speed-ratio release condition is satisfied such that the targeted driving point of the transmission 4 has entered in the 2-1 shift permission region, the variator 20 is shifted in accordance with a timing of the inertia phase (a period that the speed ratio of the sub-transmission mechanism 30 varies to the Low side) when shifting the sub-transmission mechanism 30 from second-speed to first-speed.

Then, the following describes an operational advantage by performing the above-described vehicle-body-vibration damping process.

Figure 6:
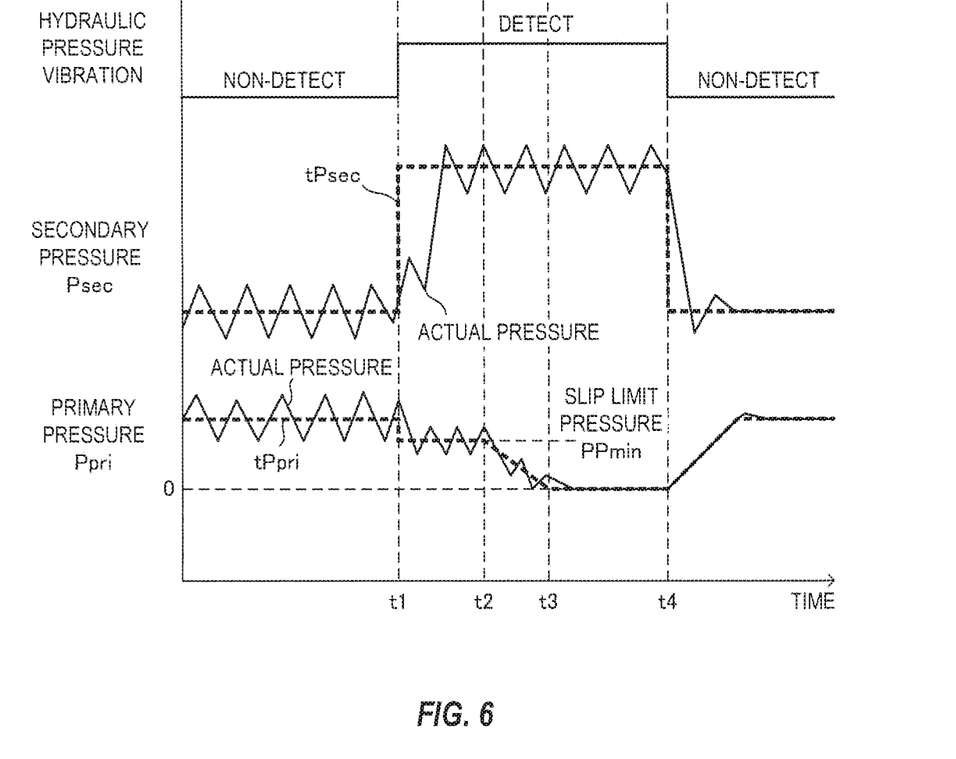
FIG. 6 is a timing chart illustrating a state that the vehicle body vibration damping control is performed.

FIG. 6 illustrates a state where the above-described vehicle-body-vibration damping process is performed. When the hydraulic pressure vibration is detected at Time t1, the secondary pressure Psec is increased, and the primary pressure Ppri is decreased. This shifts the variator 20 toward the mechanical Low speed ratio.

When the speed ratio of the variator 20 reaches the mechanical Low speed ratio at Time t2, the groove width of the primary pulley 21 stops expanding even if the primary pressure Ppri vibrates, that is, the speed ratio of the variator 20 stops changing to the Low side. This reduces the speed ratio change of the variator 20, thus ensuring suppression of the vehicle body vibration.

Then, when the primary pressure Ppri is further decreased from this state (Times t2 to t3), the movable conical plate 21m of the primary pulley 21 is pressed to the stopper 25 by the tensile force of the belt 23. This also ensures suppressing the displacement of the movable conical plate 21m in a direction that the groove width of the primary pulley 21 narrows, that is, the change to the High side of the speed ratio of the variator 20. The speed ratio change of the variator 20 is further reduced, thus ensuring further suppression of the vehicle body vibration.

It should be noted that the belt 23 is sandwiched by the primary pulley 21 with the reactive force such that the movable conical plate 21m is pressed to the stopper 25, thus the belt 23 does not slip even if the primary pressure Ppri is decreased less than the slip limit pressure PPmin.

Furthermore, decreasing the primary pressure Ppri reduces the vibration of the primary pressure Ppri, and especially, decreasing the primary pressure Ppri to zero can completely eliminate the vibration of the primary pressure Ppri, thus ensuring further suppression of the speed ratio change by the vibration of the primary pressure Ppri.

Shifting the variator 20 to the mechanical Low speed ratio when the hydraulic pressure vibration occurs is limited to when the speed ratio of the variator 20 is the Lowest speed ratio. This ensures the suppression of the amount of the change of the speed ratio when the speed ratio of the variator 20 is changed to the mechanical Low speed ratio to suppress the uncomfortable feeling that the driving force change provides to the driver.

The above-described vehicle-body-vibration damping process ensures damping the vehicle body vibration when the hydraulic pressure vibration occurs. However, a state where the secondary pressure Psec has been increased continues. It is not preferred to continue this state for a long time from the aspect of fuel consumption.

In this respect, the above-described vehicle-body-vibration damping process increases the target primary pressure tPpri and decreases the target secondary pressure tPsec to separate the speed ratio of the variator 20 from the mechanical Low speed ratio, thus changing it to the speed ratio corresponding to the targeted driving point of the transmission 4 at a predetermined transfer rate when the speed ratio of the variator 20 corresponding to the targeted operating point of the transmission 4 is changed to the High side of the Lowest speed ratio, and when the vehicle body vibration does not matter such that the driving wheels 7 does not rotate, and an engine power is not transmitted to the driving wheels 7 (after Time t4). This ensures suppressing degradation of the fuel consumption such that the state where the secondary pressure Psec has been increased continues.

When the targeted operating point of the transmission 4 enters the 2-1 shift permission region in a state where the above-described vehicle-body-vibration damping process is performed with the gear position of the sub-transmission mechanism 30 at second-speed, only the sub-transmission mechanism 30 is shifted from second-speed to first-speed with holding the speed ratio of the variator 20 at the mechanical Low speed ratio to generate the shift shock. Furthermore, afterwards, when shifting the variator 20 from the mechanical Low speed ratio, the driving force change by the change of the through speed ratio occurs to provide the uncomfortable feeling to the driver.

However, the above-described vehicle-body-vibration damping process shifts the variator 20 to the speed ratio corresponding to the targeted driving point of the transmission 4 since such case is also determined that a mechanical-Low-speed-ratio release condition is satisfied, thus ensuring prevention of the uncomfortable feeling such that the shift shock and the driving force change continuously occur.

When separating the speed ratio of the variator 20 from the mechanical Low speed ratio, the speed ratio of the variator 20 is separated in accordance with the timing of the inertia phase (the period that the speed ratio of the sub-transmission mechanism 30 varies to the Low side) when the sub-transmission mechanism 30 is shifted from second-speed to first-speed. A single speed ratio change of the variator 20 directly appears in the change of the through speed ratio, then the driving force change generated by this may provide the uncomfortable feeling to the driver. However, the speed ratio of the variator 20 is separated from the mechanical Low speed ratio in accordance with the timing of the inertia phase of the sub-transmission mechanism 30. The variator 20 is shifted to the High side, and the sub-transmission mechanism 30 is shifted to the Low side, thus ensuring suppressing the change of the through speed ratio compared with a case where they are differentially shifted. Accordingly, this ensures reducing the uncomfortable feeling that the driving force change provides to the driver.

The embodiment of the present invention described above are merely illustration of one application example of the present invention and not of the nature to limit the technical scope of the present invention to the specific constructions of the above embodiments.

The present application claims a priority of Japanese Patent Application No. 2014-154079 filed with the Japan Patent Office on Jul. 29, 2014, all the contents of which are hereby incorporated by reference.

The invention claimed is:

1. A continuously variable transmission comprising:
a primary pulley and a secondary pulley each configured to change a groove width corresponding to supplied hydraulic pressure;
a variator including a belt wrapped around the primary pulley and the secondary pulley;
a stepped sub-transmission mechanism disposed at an input side or an output side of the variator; and
a controller configured to
shift the variator from a first speed ratio, the first speed ratio being a speed ratio at a first side where the groove width of the primary pulley has a maximum value possible to be employed in a structure of the primary pulley, to a speed ratio at a second side when the sub-transmission mechanism is downshifted during controlling a speed ratio of the variator at the first speed ratio.

2. The continuously variable transmission according to claim 1, wherein
the controller is configured to shift the variator from the first speed ratio to the second side in accordance with a timing that a speed ratio of the sub-transmission mechanism changes when the sub-transmission mechanism is downshifted during controlling the speed ratio of the variator at the first speed ratio.

3. A continuously variable transmission comprising:
a primary pulley and a secondary pulley each configured to change a groove width corresponding to supplied hydraulic pressure;
a variator including a belt wrapped around the primary pulley and the secondary pulley;
a stepped sub-transmission mechanism disposed at an input side or an output side of the variator; and
control means for shifting the variator from a first speed ratio, the first speed ratio being a speed ratio at a first side where the groove width of the primary pulley has a maximum value possible to be employed in a structure of the primary pulley, to a speed ratio at a second side when the sub-transmission mechanism is downshifted during controlling a speed ratio of the variator at the first speed ratio.

4. A method for controlling a continuously variable transmission including a primary pulley and a secondary pulley each configured to change a groove width corresponding to supplied hydraulic pressure, a variator including a belt wrapped around the primary pulley and the secondary pulley, and a stepped sub-transmission mechanism disposed at an input side or an output side of the variator, the method comprising:
shifting the variator from a first speed ratio, the first speed ratio being a speed ratio at a first side where the groove width of the primary pulley has a maximum value possible to be employed in a structure of the primary pulley, to a speed ratio at a second side when the sub-transmission mechanism is downshifted during controlling a speed ratio of the variator at the first speed ratio.

5. A continuously variable transmission comprising:
a primary pulley and a secondary pulley each configured to change a groove width corresponding to supplied hydraulic pressure;
a variator including a belt wrapped around the primary pulley and the secondary pulley;
a stepped sub-transmission mechanism disposed at an input side or an output side of the variator; and
a controller configured to
shift the variator from a predetermined speed ratio, the predetermined speed ratio being a speed ratio where the groove width of the primary pulley has a maximum value possible to be employed in a structure of the primary pulley, in a direction in which the groove width of the primary pulley narrows when the sub-transmission mechanism is downshifted during controlling a speed ratio of the variator at the predetermined speed ratio.

6. The continuously variable transmission according to claim 5, wherein
the controller is configured to shift the variator from the predetermined speed ratio in the direction in which the groove width of the primary pulley narrows in accordance with a timing that a speed ratio of the sub-transmission mechanism changes when the sub-transmission mechanism is downshifted during controlling the speed ratio of the variator at the predetermined-speed ratio.

7. A continuously variable transmission comprising:
a primary pulley and a secondary pulley each configured to change a groove width corresponding to supplied hydraulic pressure;
a variator including a belt wrapped around the primary pulley and the secondary pulley;
a stepped sub-transmission mechanism disposed at an input side or an output side of the variator;
control means for shifting the variator from a predetermined speed ratio, the predetermined speed ratio being a speed ratio where the groove width of the primary pulley has a maximum value possible to be employed in a structure of the primary pulley, in a direction in which the groove width of the primary pulley narrows when the sub-transmission mechanism is downshifted during controlling a speed ratio of the variator at the predetermined speed ratio.

8. A method for controlling a continuously variable transmission including a primary pulley and a secondary pulley each configured to change a groove width corresponding to supplied hydraulic pressure, a variator including a belt wrapped around the primary pulley and the secondary pulley, and a stepped sub-transmission mechanism disposed at an input side or an output side of the variator, the method comprising:

shifting the variator from a predetermined speed ratio, the predetermined speed ratio being a speed ratio where the groove width of the primary pulley has a maximum value possible to be employed in a structure of the primary pulley, in a direction in which the groove width of the primary pulley narrows when the sub-transmission mechanism is downshifted during controlling a speed ratio of the variator at the predetermined speed ratio.

* * * * *